United States Patent [19]

Fricke

[11] Patent Number: 5,214,260
[45] Date of Patent: May 25, 1993

[54] ELECTRICAL DISCHARGE MACHINE WIRE ELECTRODE GUIDING DEVICE

[75] Inventor: William R. Fricke, Bloomingdale, Ill.

[73] Assignees: Fort Wayne Wire Die, Inc., Fort Wayne, Ind.; T-Star Industrial Electronics Corp., Wheeling, Ill.

[21] Appl. No.: 679,724

[22] Filed: Apr. 3, 1991

[51] Int. Cl.5 ............................................. B23H 7/10
[52] U.S. Cl. ............................................. 219/69.12
[58] Field of Search ........................ 219/69.12, 69.14

[56] References Cited

U.S. PATENT DOCUMENTS

| | | | |
|---|---|---|---|
| 2,974,216 | 3/1961 | Inoue | 219/69.12 |
| 3,943,322 | 3/1976 | Lehmann et al. | 219/69.15 |
| 4,605,834 | 8/1986 | Inoue | 219/69.12 |
| 4,613,740 | 9/1986 | Ichikawa | 219/69.12 |
| 4,638,140 | 1/1987 | Obara et al. | 219/69.12 |
| 4,667,078 | 5/1987 | Kilcher et al. | 219/69.12 |
| 4,751,362 | 6/1988 | Girardin | 219/69.12 |
| 4,814,574 | 3/1989 | Babel et al. | 219/69.12 |
| 4,937,414 | 6/1990 | Perreault et al. | 219/69.12 |
| 4,945,200 | 7/1990 | Truty et al. | 219/69.12 |
| 5,073,690 | 12/1991 | Corbin et al. | 219/69.12 |

FOREIGN PATENT DOCUMENTS

| | | | |
|---|---|---|---|
| 60-80525 | 5/1983 | Japan | 219/69.14 |
| 58-160020 | 9/1983 | Japan | 219/69.14 |
| 60-259324 | 12/1985 | Japan | 219/69.14 |
| 61-226227 | 10/1986 | Japan | 219/69.12 |
| 2-48122 | 2/1990 | Japan | 219/69.14 |
| 655884 | 5/1986 | Switzerland | 219/69.12 |

Primary Examiner—Geoffrey S. Evans
Attorney, Agent, or Firm—George Pappas

[57] ABSTRACT

A wire guiding device for enabling the guiding of a wire electrode at an angle with respect to the normal straight line of wire travel. The wire is placed at an angle by the upper and/or lower wire guide assemblies being displaced from one another. The wire guiding device includes a guide member having a bore that increases in diameter toward a first opening and wherethrough the wire electrode is received. The guide member is pivotally supported and is allowed to pivotally move about a point along the longitudinal axis of the bore about two axes of rotation. Pivotal movement of the guide member is caused by the wire electrode traveling at an angle between the guide assemblies with respect to the normal straight line of wire travel. Fluid under pressure is caused to be directed through the guide member and out toward a workpiece substantially surrounding the wire electrode for flushing the workpiece cutting area. The guide member incorporates wear-resistant materials such as natural diamond, diamond film, synthetic diamond, ceramic, carbide, sapphire, or cubic boron nitride, for enhancing its wear characteristics.

22 Claims, 4 Drawing Sheets

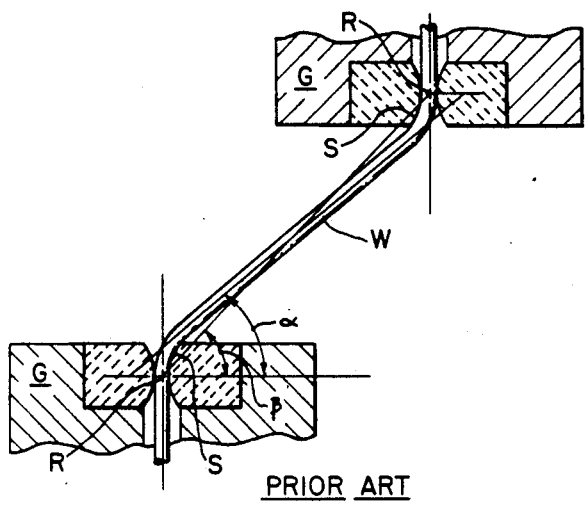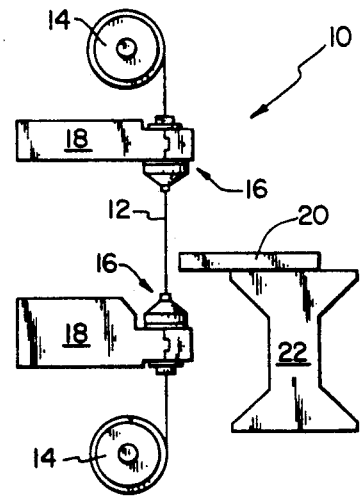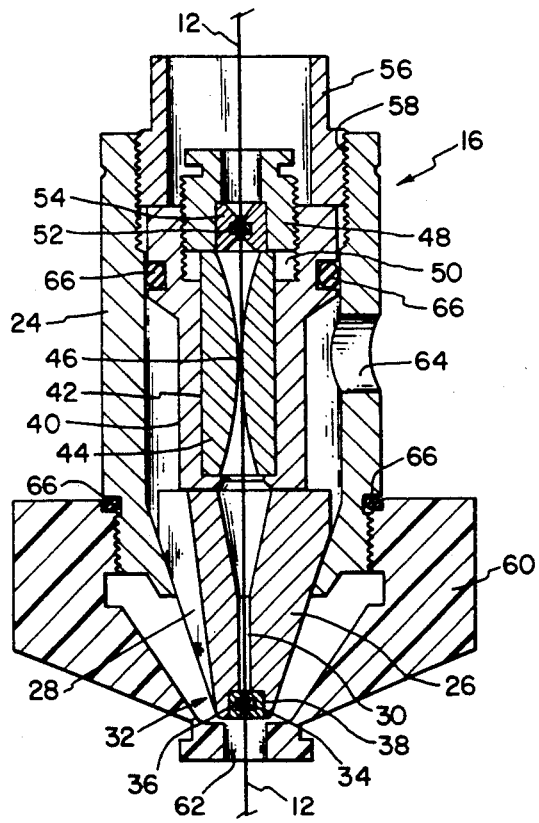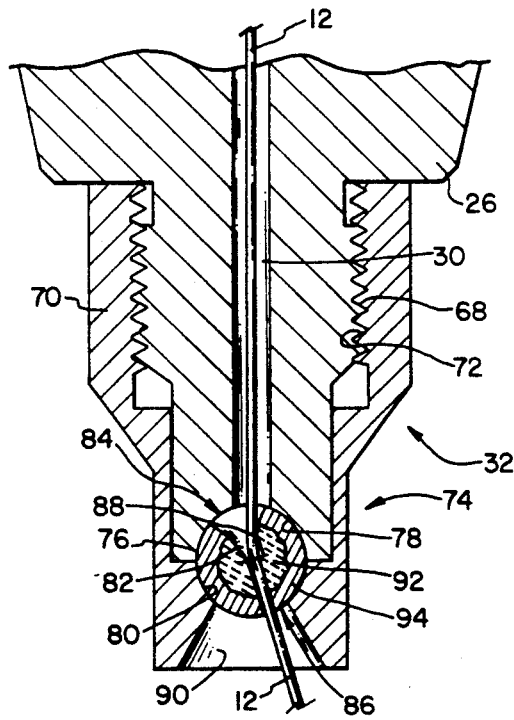
FIG. 1A PRIOR ART
FIG. 1B
FIG. 2
FIG. 4

ELECTRICAL DISCHARGE MACHINE WIRE ELECTRODE GUIDING DEVICE

TECHNICAL FIELD

The present invention relates to the technical field of the electrical discharge machine (EDM) apparatuses having a traveling wire electrode. More specifically, the present invention relates to a wire electrode guiding device whereby the moving wire electrode may be guided at an angle between the electrical discharge machine upper and lower wire guiding assemblies thereby enabling cutting of the workpiece at an angle.

BACKGROUND OF THE INVENTION

EDM apparatuses that use an electrically-conductive traveling wire for an electrode first generally became commercially available in approximately the 1970's. These apparatuses are commonly presently used in making precise cuts and shaping various electrically-conductive materials or workpieces. Typically, the wire electrode is wound around and travels between two turning spools and a pair of wire guides or guide assemblies, wherethrough the wire travels, are used to accurately situate or guide the moving wire electrode at the proper location with respect to the workpiece being cut. The wire and the workpiece are placed at different electrical potentials and a controlled electrical spark traveling between the wire and the workpiece causes the workpiece to be eroded and cut or shaped in a desired manner.

The first wire EDM apparatuses utilized a positioning table capable of moving the workpiece in a single plane along two orthogonal axes. By providing numerically-controlled servo motors on each of the two axes, the workpiece could be positioned with respect to the wire electrode for producing perpendicular cuts as desired along the workpiece.

Wire electrode machines were, thereafter, modified to provide taper cutting. Initially, the upper wire guide assembly was orbited to produce a taper cut such as is needed, for example, for draft clearances between punch and dies. Although orbiting the upper guide assembly worked for providing small angled cuts, the cutting speed was severely decreased because more material had to be removed. Further, the taper was limited to the offset in the oscillating guide.

Steeper angular cuts were later made capable without orbiting the upper wire guide but, rather, moving the upper guide with respect to the lower guide and placing the wire electrode at an angle with respect to the workpiece. As can be appreciated, although this means of angle cutting is effective, it is limited to smaller angles because of the inaccuracies created by the path of the wire being distorted. This distortion is shown in FIG. 1A whereat the upper and lower guides G are offset from one another and the guide outer surface S causes the wire W to be moved at an angle $\alpha$ rather than $\beta$ of the line intersecting reference points R. In addition, the wire W is caused to distort and overshoot the desired path and further inaccuracies are thus created.

A solution to EDM angle cutting has been to mechanically pivot the upper and lower wire guide assemblies while simultaneously moving the assemblies in a plane parallel to the workpiece and, thus, having the wire electrode exit and enter the guide assemblies generally co-linear therewith. Examples of such wire guiding assemblies and apparatuses are shown in U.S. Pat. Nos. 4,667,078 and 4,751,362. As can be appreciated, although these guide assemblies provide for angle cutting, the mechanical components for pivoting the guide assemblies create a system that is very complex, difficult to maintain, and generally costly.

Accordingly, a need exists for a wire electrode guiding device that solves the problem associated with prior guiding devices and provides for EDM larger angle cutting with a generally dependable, lower cost and accurate system.

SUMMARY OF THE INVENTION

It is the principal object of the present invention to overcome the above-discussed disadvantages associated with prior EDM wire guiding devices.

The present invention overcomes the disadvantages associated with prior guide assemblies by providing a final wire electrode guiding device on the guide assembly which is capable of pivoting so as to be parallel with the wire electrode exiting or entering the guide assembly. The guiding device, according to the present invention, is adapted for use with an electrical discharge machine capable of upper and/or lower guide assembly movement in the plane of the workpiece. As the upper and lower guide assemblies are displaced with respect to one another placing the wire electrode at an angle therebetween, although the wire electrode travels through the wire guide assemblies at a normal straight line of wire travel, the wire guiding device according to the present invention pivots about a point along the normal straight line of wire travel and provides a smooth curvilinear surface for the wire to travel thereover leaving the guiding device perpendicular thereto and toward the other guide assembly of the electrical discharge machine. The cutting angle is, thus, always a function of the locations of the upper and lower guiding devices' pivot points.

The guiding device, according to the present invention, includes a guide member having a bore therethrough with a longitudinal axis generally collinear with the normal straight line of wire travel. At one end, the bore increases in diameter and is curvilinear in cross section. The guide member is pivotally supported for allowing pivotal movement thereof about a point along the bore longitudinal axis. As the wire electrode is placed at an angle with respect to the normal straight line of wire travel, the guide member is caused to pivot about the pivot point and placing the bore curvilinear portion in contact with the wire electrode. As the cutting angle is increased, a greater portion of the bore curvilinear portion is placed in contact with the wire electrode.

Cutting efficiency is increased by flushing the cutting area. In this regard, the wire guiding device, according to the present invention, causes a fluid such as deionized water to be discharged in a stream around the wire electrode at any given cutting angle. The fluid, under pressure, is directed through a plurality of pathways in the guide member and to a cylindrical fluid directing portion that surrounds the wire electrode that, in turn, causes the fluid to be propelled in a stream along and around the wire electrode.

So as to increase the life of the guiding device, according to the present invention, the bore is formed of a wear-resistant material, such as natural diamond, diamond film, synthetic diamond, sapphire, ceramic, carbide, or cubic boron nitride. In larger guiding devices, a first wear-resistant member is provided at one end of the bore forming the curvilinear increasing diameter portion and a second wear-resistant member is provided at the bore other opening.

In one form thereof, the present invention is directed to an EDM wire electrode guiding device including a guide member. A bore is provided through the guide member and having a first opening and a second opening at opposite ends thereof and a longitudinal axis. The bore increases in diameter toward the first opening. A gimbal device is provided for allowing pivotal movement of the guide member and bore about a point along the longitudinal axis. The pivotal movement of the guide member is accomplished by the wire electrode traveling at an angle with respect to the normal straight line of wire travel.

The gimballing device allows pivotal movement of the guide member about first and second axis of rotation, each axis being orthogonal to one another and to the normal straight line of wire travel, and also intersecting the normal straight line of wire travel at the pivot point. In one form thereof, the gimballing device includes a ball-shaped guide body supported in a socket assembly. In a second form, the gimballing device includes a first ring pivotally supported for rotation about the first axis of rotation while the guide member is pivotally supported within the first ring for rotation about the second axis of rotation.

A flushing system may be provided for directing fluid through the guide member and out toward the workpiece substantially surround the wire electrode. The flushing fluid is forced to pathways within the guide member to a cylindrical fluid directing portion near the second bore opening and out substantially around the wire electrode toward the workpiece.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 1A is a diagrammatic cross-sectional view of a prior art guiding device showing the experienced inaccuracies;

FIG. 1B is a diagrammatic side elevational view of an electrical discharge machine apparatus;

FIG. 2 is a cross-sectional view of a typical wire guide assembly and wire guiding device of the prior art;

FIG. 4 is a cross-sectional view of the wire guiding device shown in FIG. 3 in an assembled state;

Corresponding reference characters indicate corresponding parts throughout the several views of the drawings.

Figure 3:
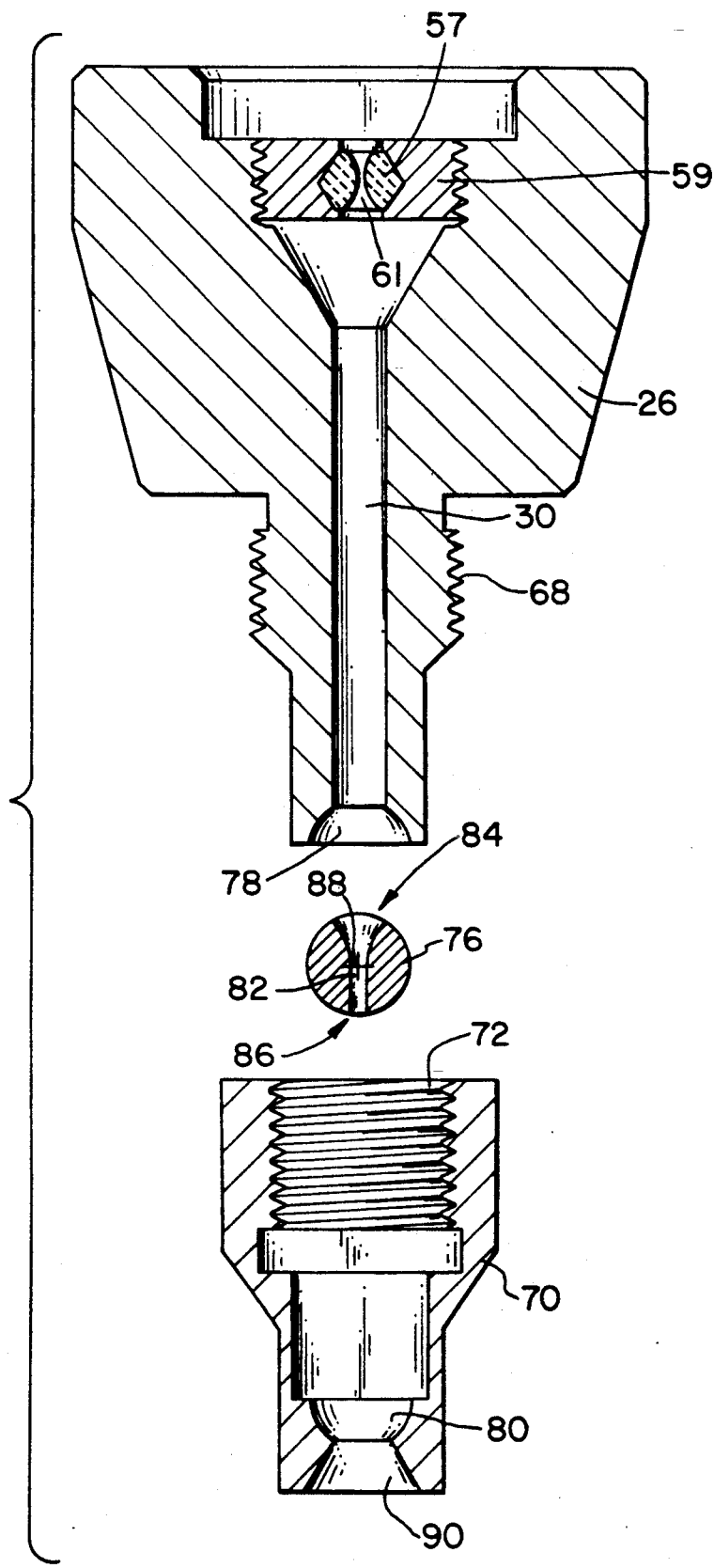
FIG. 3 is a cross-sectional exploded view of a ball and socket wire guiding device according to the present invention.
Figure 5:
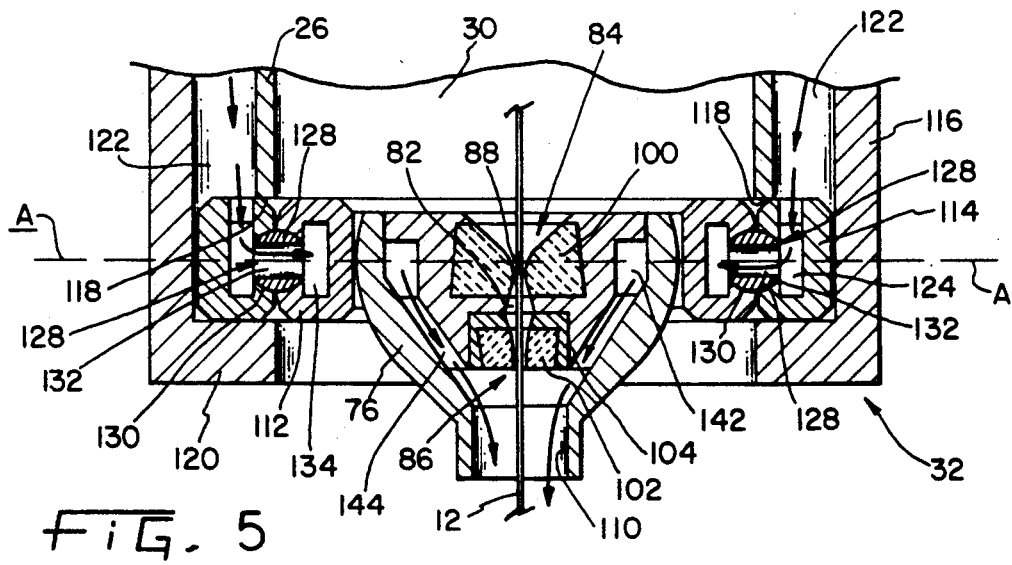
FIG. 5 is a cross-sectional view of a wire guiding device according to the present invention supported at the tip of a guide assembly and incorporating a ring-type gimballing system.
Figure 6:
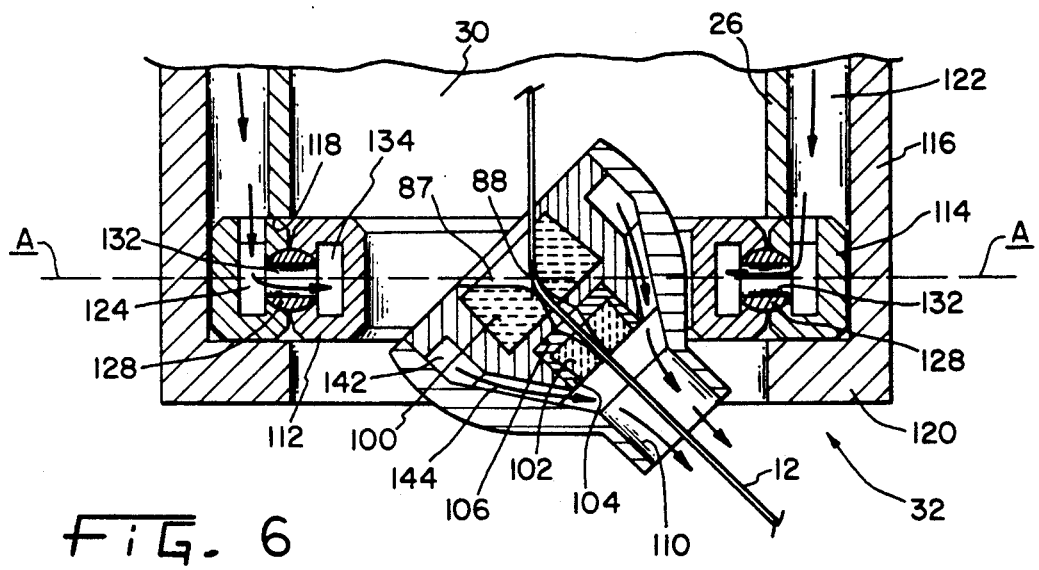
FIG. 6 is a cross-sectional view of the guiding device shown in FIG. 5 and showing the guide member being pivoted by the wire electrode about one axis of rotation.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

As shown in FIG. 1, an electrical discharge machine generally indicated as 10 utilizes a wire electrode 12 wrapped around spools 14. Spools 14 are rotated and wire electrode 12 travels therebetween. Wire guide assemblies generally indicated as 16 are mounted on the ends of arms 18. Wire electrode 12 is received through assemblies 16 and is guided thereby. Workpiece 20, generally made of a conductive material, is held on table 22 so that it may be cut and/or shaped by the moving wire electrode 12. Arms 18 and/or table 22 are moved with respect to one another so that wire electrode 12 may travel through workpiece 20 cutting and shaping the same in a predetermined desired manner. The cutting is accomplished by placing workpiece 20 and wire electrode 12 at different electric potentials and causing a spark therebetween, thus, causing the workpiece 20 to be electro-eroded in a desired fashion. Arms 18 may be displaced with respect to one another in the same plane as workpiece 20 thus placing wire electrode 12 at an angle and thereby cutting workpiece 20 at a given desired angle.

A typical guide assembly 16 is shown in FIG. 2 and includes a barrel 24. Barrel 24 has an upper cylindrical portion and a lower frusto-conical section whereat there is received a guide body 26. Guide body 26 includes a plurality of outer channels 28 and a wire guide bore 30 at the longitudinal center thereof. At one end 32 of guide body 26 there is mounted a diamond wear-resistant member 34 within a sintered metal nib 36 which is, in turn, affixed within a cavity 38 at the end 32 of guide body 26. Wear-resistant member 34 has a bore therethrough in communication with wire guide bore 30 for receiving wire electrode 12 therethrough. A current pickup holding member 40 is located above guide body 26 and includes an off-center bore 42. A current pickup device 44 is received within off-center bore 42 and includes an inner contact wall 46. An electric potential is placed on current pickup device 44 and the same is transferred to wire electrode 12 by physical contact between wire electrode 12 and inner contact wall 46 of current pickup 44.

Current pickup 44 is retained within bore 42 via a nut member 48 threadingly received within threaded bore 50 at one end of current pickup holding member 40. A preguide wear-resistant member 52 is mounted in sintered metal nib 54 which is, in turn, affixed within nut member 48. Preguide member 52 includes a bore for receiving wire electrode 12 therethrough and guiding the wire electrode in the normal straight line of wire travel.

A retaining nut member 56 is threadingly received within threaded bore 58 at the end of barrel 24. Retaining nut member 56 serves to hold, within barrel 24, both current pickup holding member 40 and guide body 26.

At the other end of barrel 24, nozzle 60 is threadingly received on barrel 24. Nozzle 60 includes an outlet 62 wherethrough wire electrode 12 and a flushing fluid is received. More specifically, a flushing fluid such as deionized water is received under pressure through port 64 in barrel 24 and travels around current pickup holding member 40 through outer channels 28 of guide body 26 to within nozzle 60 and out through outlet 62 around wire electrode 12. O-rings 66 serve to hermetically seal and allow the fluid to travel only as described.

In FIGS. 3 and 4, there is shown an embodiment of the present invention. Guide body 26 includes a lower threaded portion 68 adapted to threadingly engage and receive thereover cap 70. More specifically, cap 70 includes a threaded bore 72 wherein there is threadingly received, as shown in FIG. 4, lower threaded portion 68. Cap 70 and the lower end of guide body 26, together make a socket assembly 74, for retaining therein ball-shaped guide member 76. Socket assembly 74 includes an upper partial sphere portion 78 formed at the end of guide body 26 and, also, a lower partial sphere portion 80 formed in cap 70. A secondary pre-guide member 57 mounted in a nib 59 and having a bore 61 therethrough may be utilized at the upper end portion of guide body 26 for stabilizing the wire electrode 12 coming from the current pickup 44 and prior to going through the final guide members as described hereinbelow.

Guide member 76 includes a bore 82 for receiving wire electrode 12 therethrough. Bore 82 has a first opening 84 and a second opening 86 at opposite ends thereof. The longitudinal axis of bore 82 is located substantially at the center thereof. Bore 82 increases in diameter toward first opening 84 and is curvilinear in cross section as shown. Guide member 76, as more fully described hereinbelow, is allowed to pivot about two axes of rotation which are orthogonal to one another and to the normal straight line of wire travel and which intersect the normal straight line of wire travel at the pivot point 88. In this embodiment, this pivot point is at the center of the spherical-shaped guide member 76 shown in FIGS. 3 and 4. Pivot point 88 is used as the proper reference point in determining the angle of the wire electrode 12 with respect to the normal straight line of wire travel given the specific locations of the upper and lower wire guide assemblies 16. It is noted that as the pivoting angle of bore 82 increases, the contacting surface in the curvilinear portion of bore 82 also increases. Preferably, the surface of the bore in the plane created by the two orthogonal axes of rotation and therebelow toward second opening 86 is parallel to the normal straight line of wire travel.

To accommodate the various angles at which wire electrode 12 exits from cap 74, a frusto-conical opening 90 is provided in cap 70 increasing in diameter away from lower partial sphere portion 80.

In FIG. 3, a guide member 76 having a ball or sphere outer surface is made of a single type of material. Preferably, this guide member 76 is made of a wear-resistant material such as natural diamond, synthetic diamond, sapphire, cubic boron nitride, or other materials or similar wear-resistant characteristics. In FIG. 4, guide member 76 also has a ball or sphere outer shape. Here, however, a wear-resistant member 92 is mounted within a nib outer spheric shell 94. Wear-resistant member 92 is made of a hard material such as that of guide member 76 of FIG. 3 while shell 94 can be made of a hard steel or tungsten carbide.

As shown in FIG. 4, guide member 76 is held within socket assembly 74 and is free to rotate about a first and a second axis of rotation. Wire electrode 12 travels through wire guide bore 30, guide member bore 82, and out through frusto-conical opening 90 of cap 70. When upper and lower guide assemblies 16 are vertically aligned with one another, wire electrode 12 travels straight through and without causing guide member 76 to pivot. However, when guide assemblies 16 are displaced with respect to one another, thus placing wire electrode 12 at an angle as shown in FIG. 4, wire electrode 12 acts against bore 82 near the second opening 86 and causes guide member 76 to pivot as shown. The pivoting movement of guide member 76 causes a greater portion of the bore 82 to come in contact with wire electrode 12 thus decreasing deleterious effects on wire electrode 12 as it travels therethrough. The frictional forces between guide member 76 and the socket assemblies 74 are minimal and, thus, only common tension is required on wire electrode 12 for causing the pivoting of guide member 76 as shown in FIG. 4.

Figure 8:
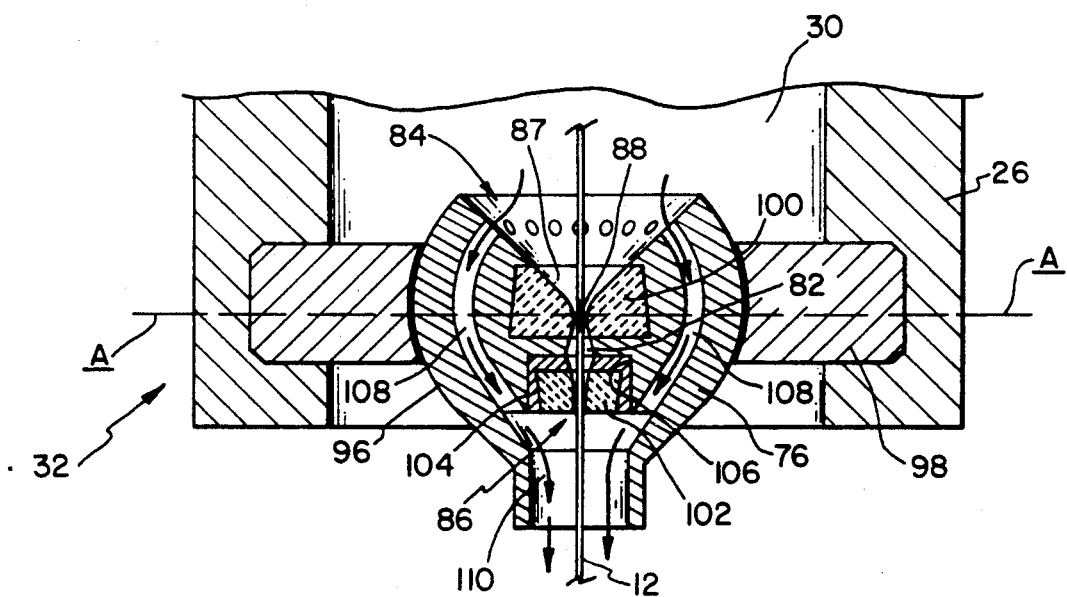
FIG. 8 is a cross-sectional view of a wire guiding device according to the present invention incorporating a ball and socket gimballing system and supported at the tip of a guiding assembly; and, FIG. 9 is a cross-sectional view of the wire guiding device shown in FIG. 7 taken along line 9—9.

In another embodiment as shown in FIG. 8, guide member 76 has an outer sphere or ball-shaped surface 96 supported in a socket assembly or member 98. Socket member 98 is supported at the end 32 of guide body 26 and allows guide member 76 to pivot about two axes of rotation.

The guide member 76 shown in FIG. 8, is larger than that shown in FIGS. 3 and 4 and includes a first wear-resistant member 100 defining bore 82 at the increasing diameter portion 87 toward first opening 84. First wear-resistant member 100 is mounted within guide member 76. A second wear-resistant member 102 defining bore 82 at the second opening 86 is provided and is mounted within a sintered metal nib portion 104. Nib 104 is, in turn, mounted within a cylindrical bore 106 located in guide member 76. Both wear-resistant members 100 and 102 are made of a wear-resistant material similar to that of wear-resistant member 76 shown in FIG. 3.

As also described hereinabove with respect to the embodiment shown in FIGS. 3 and 4, the guide member 76 shown in FIG. 8 is caused to pivot about a point 88 located along the longitudinal axis of bore 82. In a similar fashion, as wire electrode 12 is placed at an angle from the normal straight line of wire travel, the guide member 76 is caused to pivot about point 88 by the wire electrode 12 acting against the walls of bore 82 substantially near second opening 86. Thus, wire electrode 12 travels through wire guide bore 30 of guide body 26 in a normal straight line of wire travel and, thereafter, comes in contact with the curvilinear portion of wear-resistant member 100 and exits guide member 76 at the angle of wire electrode 12 created between guide assemblies 16.

In addition, the guiding device shown in FIG. 8 includes a flushing means or assembly for directing fluid through guide member 76 and out toward the workpiece 20 substantially surrounding wire electrode 12. More specifically, a plurality of pathways 108 extend between and provide communication from near the first bore opening 84 to a cylindrical fluid directing portion 110 near the second bore opening 86. Fluid, such as deionized water, is provided under pressure in wire guide bore 30 and is forced as shown by the arrows through pathways 108 to cylindrical fluid directing portion 110 around wire electrode 12 and toward the workpiece 20.

A yet another embodiment of the present invention is shown in FIGS. 5, 6, 7 and 9. Here, rather than a ball and socket gimballing means, there is provided a first ring 112 pivotally supported on a second ring 114 for rotation about a first axis of rotation A. Guide member 76 is pivotally supported within first ring 112 for rotation about a second axis of rotation B. Thus, guide member 76 is gimballed for pivotal movement about axes A and B substantially in a similar fashion as the embodiments described hereinabove. More specifically, second ring 114 is retained at the tip 32 of guide body 26 by a cap 116 which is threadingly retained on guide body 26 similar to cap 70. Second ring 114 is sandwiched between surface 118 located at the tip or end 32 of guide body 26 and annular ring portion 120 forming the bottom end of cap 116. A cylindrical cavity 122 is formed between cap 116 and the tip portion of guide body 26.

Figure 7:
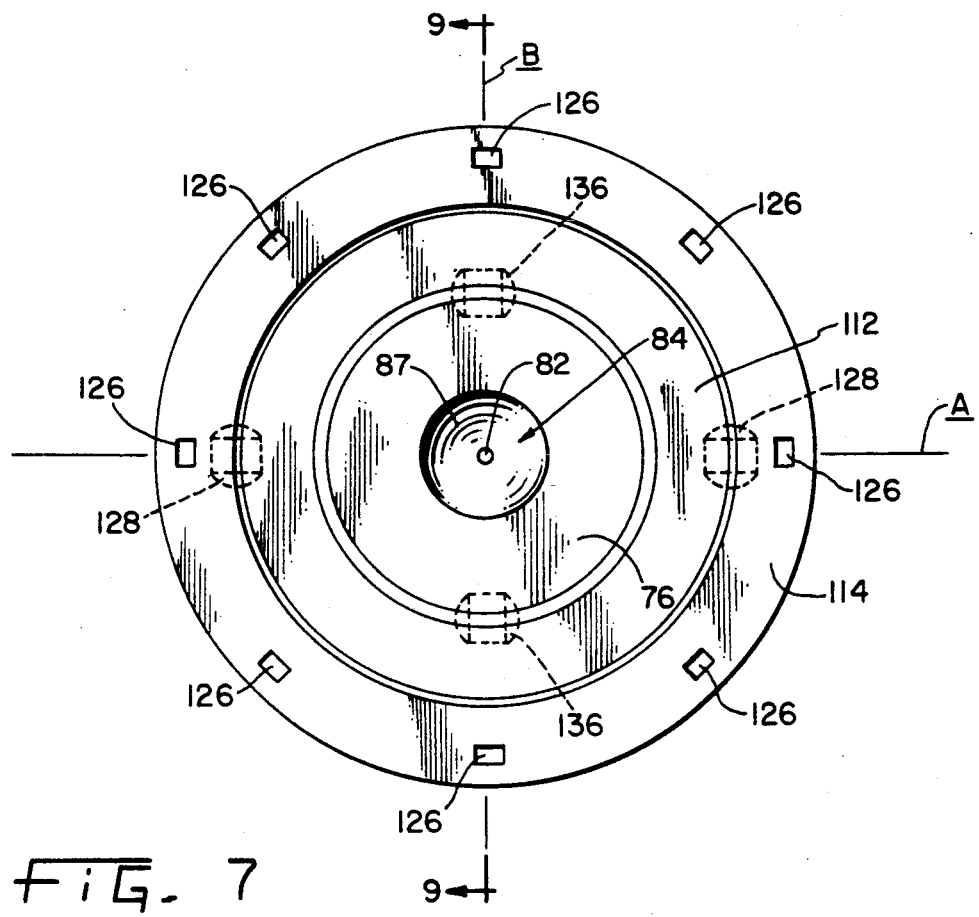
FIG. 7 is a top plan view of the guiding device shown in FIG. 5, shown separated from the wire guide assembly.

A fixed ring pipeway 124 is provided generally concentrically within ring 114 and communicates with cavity 122 through a plurality of windows 126 as shown in FIG. 7 or through the entire upper section as may be needed.

First ring 112 is pivotally attached to fixed ring 114 by a pair of grommets 128 having a spherical outer surface 130 and a cylindrical first orifice or opening 132 therethrough. The spherical outer surface 130 provides smooth rotational movement between first ring 112 and fixed ring 114 while the cylindrical opening 132 remains in communication with fixed ring pipeway 124.

Figure 9:
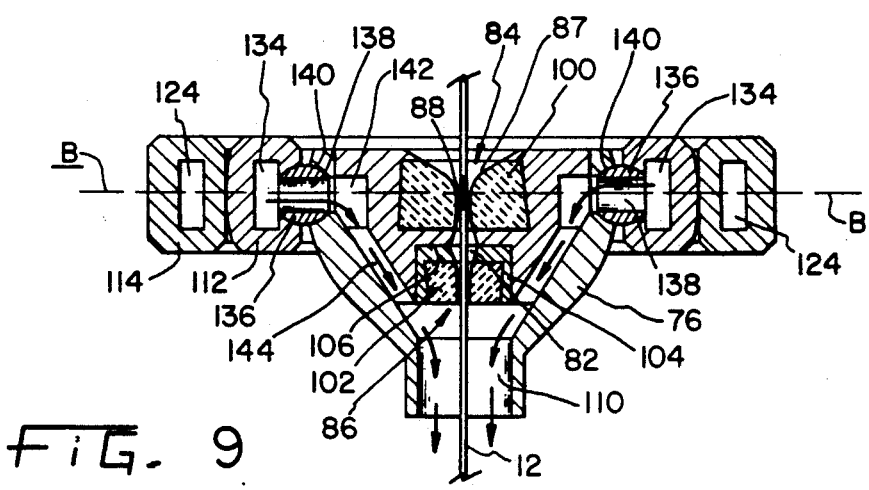

First ring 112 includes a first ring pipeway 134 therein which communicates with cylindrical opening 132 of grommet or pivotal support members 128. As shown in FIGS. 7 and 9, a second pair of grommets or pivotal supports 136 are provided between guide member 76 and first ring 112. Cylindrical or second orifice openings 138 are provided through the second pair of grommets 136. In addition, grommets 136 have spherical outer surfaces 140 similar to grommets 128. Grommets or pivotal supports 136 provide smooth rotational movement between guide members 76 and first ring 112 about axis B while cylindrical openings 138 remain in communication with first ring pipeway 134.

A second ring pipeway 142 is formed within guide member 76 and is in communication with the first ring pipeway 134 through the cylindrical openings 138 of the second pair of grommets 136. In addition, second ring pipeway 142 is in communication with a plurality of pathways or a frusto-conical cavity 144 within guide member 76 and, thus, communicates with cylindrical fluid directing portion 110. Accordingly, in this embodiment, flushing is provided by directing fluid under pressure, as shown by the arrows, through cylindrical cavity 122, windows 126, fixed ring pipeway 124, cylindrical openings 132 of grommets 128, first ring pipeway 134, cylindrical openings 138 of grommets 136, second ring pipeway 142 within guide member 76, down frusto-conical cavity 144 and, finally out through cylindrical directing portion 110 substantially around the wire electrode 12 and toward a workpiece. It is noted that the pivotal connections providing rotational movement of ring 112 and guide member 76 are hermetically sealed allowing the fluid under pressure to travel only as described hereinabove. In this embodiment, the wear-resistant members 100 and 102 are located and function in substantially the same manner as that embodiment shown in FIG. 8 and the pivotal movement of guide member 76 is caused in a similar fashion as that described hereinabove with respect to the embodiment shown in FIG. 8.

While the invention has been described as having specific embodiments, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. An electrical discharge machine wire electrode guiding device comprising:
    a guide member;
    a bore through said member having a first opening and a second opening at opposite ends thereof and a longitudinal axis, said bore increasing in diameter toward said first opening;
    said bore increasing diameter portion being curvilinear in cross-section;
    gimbal means for allowing pivotal movement of said guide member and bore about a point along said longitudinal axis by the wire electrode traveling at an angle with respect to a normal straight line of wire travel; and,
    wherein said bore curvilinear portion contacts the wire electrode when said guide member is placed at an angle and, further, wherein a greater portion of said bore curvilinear portion contacts the wire electrode as said angle increases.

2. The wire electrode guiding device of claim 1 wherein said guide member is made of at least one wear-resistant material selected from a group consisting of natural diamond, diamond film, synthetic diamond, ceramic, carbide, sapphire or cubic boron nitride.

3. The wire electrode guiding device of claim 1 further comprising a first wear-resistant member defining said bore at said increasing diameter portion and a second wear-resistant member defining said bore at said second opening.

4. The wire electrode guiding device of claim 3 wherein said first and second wear-resistant members are made of at least one wear-resistant material selected from a group consisting of natural diamond, diamond film, synthetic diamond, ceramic, carbide, sapphire or cubic boron nitride.

5. The wire electrode guiding device of claim 1 wherein said gimbal means allows pivotal movement of said guide member about first and second axes of rotation each orthogonal to one another and said normal straight line of wire travel and each intersecting said normal straight line of wire travel at said point.

6. The wire electrode guiding device of claim 5 wherein said gimbal means includes a ball-shaped guide body supported in a socket assembly.

7. The wire electrode guiding device of claim 6 wherein said guide member is made of at least one wear-resistant material selected from a group consisting of natural diamond, diamond film, synthetic diamond, ceramic, carbide, sapphire or cubic boron nitride.

8. The wire electrode guiding device of claim 6 further comprising a first wear-resistant member defining said bore at said increasing diameter portion and a second wear-resistant member defining said bore at said second opening.

9. The wire electrode guiding device of claim 6 further comprising flushing means for directing fluid through said guide member and out toward a workpiece, the directed fluid substantially surrounding the wire electrode.

10. The wire guiding device of claim 9 wherein said flushing means comprises a plurality of pathways extending from near said first bore opening to a cylindrical fluid directing portion near said second bore opening wherethrough the wire electrode travels, whereby fluid under pressure is forced through said pathways and said cylindrical fluid directing portion and substantially around the wire electrode toward a workpiece.

11. The wire electrode guiding device of claim 5 wherein said gimbal means comprises a first ring pivotally supported for rotation about said first axis of rotation and wherein said guide member is pivotally supported within said first ring for rotation about said second axis of rotation.

12. The wire electrode guiding device of claim 11 wherein said guide member is made of at least one wear-resistant material selected from a group consisting of natural diamond, diamond film, synthetic diamond, ceramic, carbide, sapphire or cubic boron nitride.

13. The wire electrode guiding device of claim 11 further comprising a first wear-resistant member defining said bore at said increasing diameter portion and a second wear-resistant member defining said bore at said second opening.

14. The wire electrode guiding device of claim 11 further comprising flushing means for directing fluid through said guide member and out toward a workpiece, the directed fluid substantially surrounding the wire electrode.

15. The wire electrode guiding device of claim 14 wherein said flushing means includes:
   a first orifice opening in said first ring pivotal support;
   a first ring pipeway through said first ring in communication with said first orifice opening;
   a second orifice opening in said pivotal support between said guide member and said first ring, said second orifice opening being in communication with said first ring pipeway;
   a second ring pipeway in said guide member in communication with said second orifice opening; and,
   a pathway in communication with said second ring pipeway extending to a cylindrical fluid directing portion near said second bore opening wherethrough the wire electrode travels, whereby fluid under pressure is forced through said first orifice opening, first ring pipeway, second orifice opening, second ring pipeway, said pathway, and said cylindrical fluid directing portion and substantially around the wire electrode toward a workpiece.

16. The wire electrode guiding device of claim 1 further comprising flushing means for directing fluid through said guide member and out toward a workpiece, the directed fluid substantially surrounding the wire electrode.

17. The wire electrode guiding device of claim 1 wherein said increasing diameter portion is made of at least one wear-resistant material selected from a group consisting of natural diamond, diamond film, synthetic diamond, ceramic, carbide, sapphire, or cubic boron nitride.

18. An electrical discharge machine wire electrode guiding device comprising:
   a guide member;
   a bore through said member having a first opening and a second opening at opposite ends thereof and a longitudinal axis, said bore increasing in diameter toward said first opening;
   gimbal means for allowing pivotal movement of said guide member and bore about a point along said longitudinal axis by the wire electrode traveling at an angle with respect to a normal straight line of wire travel, the gimbal means allowing pivotal movement of said guide member about first and second axes of rotation each orthogonal to one another and said normal straight line of wire travel and each intersecting said normal straight line of wire travel at said point; and,
   wherein said gimbal means comprises a first ring pivotally supported for rotation about said first axis of rotation and wherein said guide member is pivotally supported within said first ring for rotation about said second axis of rotation.

19. The wire electrode guiding device of claim 18 wherein said guide member is made of at least one wear-resistant material selected from a group consisting of natural diamond, diamond film, synthetic diamond, ceramic, carbide, sapphire or cubic boron nitride.

20. The wire electrode guiding device of claim 18 further comprising a first wear-resistant member defining said bore at said increasing diameter portion and a second wear-resistant member defining said bore at said second opening.

21. The wire electrode guiding device of claim 18 further comprising flushing means for directing fluid through said guide member and out toward a workpiece, the directed fluid substantially surrounding the wire electrode.

22. The wire electrode guiding device of claim 18 wherein said flushing means includes:
   a first orifice opening in said first ring pivotal support;
   a first ring pipeway through said first ring in communication with said first orifice opening;
   a second orifice opening in said pivotal support between said guide member and said first ring, said second orifice opening being in communication with said first ring pipeway;
   a second ring pipeway in said guide member in communication with said second orifice opening; and,
   a pathway in communication with said second ring pipeway extending to a cylindrical fluid directing portion near said second bore opening wherethrough the wire electrode travels, whereby fluid under pressure is forced through said first orifice opening, first ring pipeway, second orifice opening, second ring pipeway, said pathway, and said cylindrical fluid directing portion and substantially around the wire electrode toward a workpiece.

* * * * *